United States Patent [19]
Mattern

[11] Patent Number: 5,588,720
[45] Date of Patent: Dec. 31, 1996

[54] CIRCUIT ARRANGEMENT FOR A BRAKE SYSTEM WITH ANTI-LOCK SYSTEM AND/OR TRACTION CONTROL

[75] Inventor: Klaus-Peter Mattern, Beilstein, Germany

[73] Assignee: Robert Bosch GmbH, Stuttgart, Germany

[21] Appl. No.: 580,891

[22] Filed: Dec. 29, 1995

[30] Foreign Application Priority Data

Jan. 5, 1995 [DE] Germany ................ 195 00 188.5

[51] Int. Cl.[6] ................ B60T 8/32; B60K 28/16
[52] U.S. Cl. ................ 303/122.08; 303/122; 303/176; 188/181 C
[58] Field of Search ................ 303/122.08, 122.05, 303/20, 122.01, 122, 122.03, 176, 122.07; 188/181 C; 364/426.01, 426.02, 426.03

[56] References Cited

U.S. PATENT DOCUMENTS

| | | | |
|---|---|---|---|
| 4,546,437 | 10/1985 | Bleckmann et al. | 303/122.05 |
| 4,773,072 | 9/1988 | Fennel | 303/122.05 |
| 5,001,641 | 3/1991 | Makino | 303/122.07 |
| 5,176,429 | 1/1993 | Junichi et al. | 303/122.05 |
| 5,372,410 | 12/1994 | Miller et al. | 303/20 |
| 5,411,324 | 5/1995 | Zydek et al. | 303/122.05 |
| 5,458,404 | 10/1995 | Fennel et al. | 303/122 |

FOREIGN PATENT DOCUMENTS 9309986  5/1993  WIPO.

*Primary Examiner*—Douglas C. Butler
*Attorney, Agent, or Firm*—Felfe & Lynch

[57] ABSTRACT

In a circuit arrangement for a brake system with anti-lock system and/or traction control with input circuits, output circuits, control circuits, monitoring circuits, comparator circuits and circuits for switching off the control in the event of a fault, a continuous monitoring of the control circuits and of the monitoring circuits is made possible. Both the control circuits and the monitoring circuits comprise watchdog circuits for processing a watchdog algorithm which tests the functioning of the control circuits and monitoring circuits and comparator circuits for comparing the results of the watchdog algorithms respectively processed in the watchdog circuits. The output circuits only enable the control if both the control signals output by the control circuits correspond to the corresponding signals of the monitoring circuits and the results of the watchdog algorithms respectively processed in the watchdog circuits correspond.

15 Claims, 4 Drawing Sheets

CIRCUIT ARRANGEMENT FOR A BRAKE SYSTEM WITH ANTI-LOCK SYSTEM AND/OR TRACTION CONTROL

Prior Art

The invention relates to a circuit arrangement for a brake system with anti-lock system and/or traction control according to the preamble of patent claim 1.

WO 93/09986 discloses a circuit arrangement for a brake system with anti-lock system and/or traction control for a motor vehicle, which circuit arrangement comprises input circuits for conditioning sensor signals which represent the rotational behavior of the individual vehicle wheels, output circuits for outputting control signals for actuating solenoid valves which are exerted into the pressure medium paths of the brake, control circuits for processing the conditioned sensor signals and for generating the brake pressure control signals, output circuits for actuating solenoid valves, monitoring circuits to which all the conditioned sensor signals are fed and circuits for comparing and correlating the signals of the control circuits with the corresponding signals of the monitoring circuits and circuits for switching off the control in the event of a fault.

In this circuit arrangement the control circuits and the associated input circuits for conditioning the sensor signals are components of a control microcontroller and the monitoring circuits are components of a monitoring microcontroller.

The monitoring microcontroller processing processes a model algorithm which constitutes a simplified simulation of the control algorithm. The signals generated by the control circuits are compared with the corresponding signals of the monitoring circuits and in the event of a fault, i.e. in the event of incorrect functioning of the control microcontroller or of the monitoring microcontroller, the control is switched off.

The control signals generated by the control microcontroller are checked for plausibility and correctness by means of this complex, parallel model computation which is closely based on the control algorithm, as a result of which a comparatively high detection probability of faults which are relevant to the controller is obtained. However, it is disadvantageous with this circuit arrangement that partial checking as to whether the two microcontrollers are functioning satisfactorily only takes place indirectly. In an extreme case, it would be for example imaginable that correspondence between the conditioned sensor signals of the control microcontroller with the signals of the monitoring microcontroller is signaled although one microcontroller has a computer malfunction which, however, does not affect the region of input signal conditioning.

An absence of explicit checking of the control and monitoring computers is in particular disadvantageous also because for example, the anti-lock system of a brake system is not continuously in use but rather is only employed in specific hazard situations. Specifically in these situations, the malfunction would first have to be detected by the monitoring computer during the control process and, if appropriate, the control system would have to be switched off. In other words, malfunctioning of the control system cannot be detected until a control takes place, i.e. in a critical hazard situation. On the other hand, the failure of a computer before this time can only be detected with a low degree of probability.

Moreover, it proves disadvantageous that all four signals detected by the wheel sensors always have to be processed simultaneously in the monitoring computer. A monitoring microcontroller which has a simplified structure in comparison with the control microcontroller is indeed already provided in the circuit arrangement known from WO 93/09986. Nevertheless, the simultaneous processing of all four sensor signals requires an extremely complex monitoring microcontroller.

The object of the invention is therefore to improve a circuit arrangement for a brake system with anti-lock system and/or traction control to the extent that in addition to the checking of the control signals by the model computation in the monitoring computer a continuous checking of the computer functions of the control computer and of the monitoring computer takes place in particular even when no control is taking place, i.e. in the so-called standby mode, it being possible for a computer with a substantially simplified structure in comparison with the control computer to be used as monitoring computer.

Advantages of the Invention

In a circuit arrangement of the generic type for a brake system with anti-lock system and/or traction control the invention is achieved by means of characterizing features of. It has the advantage that—in addition to checking the control signals, output by the control circuits, by means of the model algorithm being processed in the monitoring circuits—the satisfactory functioning of the control and monitoring circuits is continuously checked by the processing of the watchdog algorithm in the watchdog circuits, in particular even if no control is taking place, i.e. in the standby mode. As a result, in particular even faults which become manifest in a reduced system performance (for example lengthening of the braking distance) can be detected particularly advantageously.

Moreover, the checking of the functioning of the control and monitoring circuits by the processing of a watchdog algorithm in the watchdog circuits can be used independently of the control system selected.

Finally, by virtue of the combination of model algorithm and watchdog algorithm for checking the overall controller system not only is a substantial increase in the reliability testing of the control system possible but also it is a further advantage that the model algorithm can be of simpler design in comparison with that of known circuit arrangements since additional checking of the overall system by the watchdog algorithm is always taking place.

Embodiments of the invention are described in the subclaims. For example, It is particularly advantageous if the control circuits, together with the associated input circuits, output circuits for outputting brake pressure control signals, watchdog circuits and comparator circuits, are part of a control computer, while the monitoring circuits, together with the associated input circuits, output circuits, circuits for processing the model algorithm, watchdog circuits and comparator circuits, are part of a monitoring computer. In this case, the CPU function, and thus the operational capability of the two computers, are continuously checked by the watchdog circuits of the control computer and of the monitoring computer in each case in a controller-independent fashion.

A further substantial advantage is that both the first and the second input circuits have multiplexers and comparator circuits which compare individual conditioned sensor signals with one another in a time-division multiplexing method and switch off the control in the event of a fault which occurs for example if the speeds of the individual vehicle wheels do not correspond within prescribed tolerance ranges, which is physically impossible. As a result, not only is monitoring of the input signals ensured by the actual input circuits, and the entire control switched off in the event of a fault, but also by virtue of the fact since in each case only one sensor signal is fed to the monitoring computer in the time-division multiplexing method, in a reduction of the data to be processed by the monitoring computer in the model algorithm is also made possible. In comparison with known monitoring computers this results in a reduction of the sensor signals processed from four to one. This permits the use of a monitoring computer which can have a substantially simpler structure in comparison with the control computer. This structure can be substantially simpler in particular in comparison with that of known monitoring computers which are used in the circuit arrangements known from the prior art.

In order to test the functioning of the control and monitoring computers as comprehensively as possible, the watchdog algorithms are advantageously based on test data, as output data, which permit all the computer functions to be monitored. For this purpose, preferably the entire range of values of the computers are cyclically processed in the watchdog algorithms with statistical distribution as test data.

In order to make the outputting of the data as effective as possible, first output drivers for actuating the wheel solenoid valves and for receiving acknowledgement signals are connected downstream of the output circuits which are assigned to the control computer, whereas second output drivers for actuating further components and for receiving further acknowledgement signals are connected downstream of the output circuits assigned to the monitoring computer.

As a result, not only is division of the actuation of the peripheral components between the two computers which are different in terms of their capacity and computational power made possible but, moreover, monitoring and, if appropriate, deactivation of the control system even during the outputting of the control signals is also provided.

DESCRIPTION OF THE EXEMPLARY EMBODIMENTS

An operational check of a control computer and a monitoring computer, in particular an operational check of the CPUs of these is performed continuosly in a circuit arrangement for a brake system with anti-lock system and/or traction control. The control computer, uses a control algorithm and, in the monitoring computer, a simplified model of the control algorithm (model algorithm) which permits the control signals generated by the control algorithm to be checked within a specific prescribed tolerance range (tolerance window). By combining the checking of the controller functions by the model algorithm with the checking of the computer function by the watchdog algorithm, not only is a substantial increase in the checking of the operational reliability of the entire control system obtained but faults which reduce the system performance, such as for example lengthening of the braking distance and the like, can also be detected in a simple way.

Figure 1:
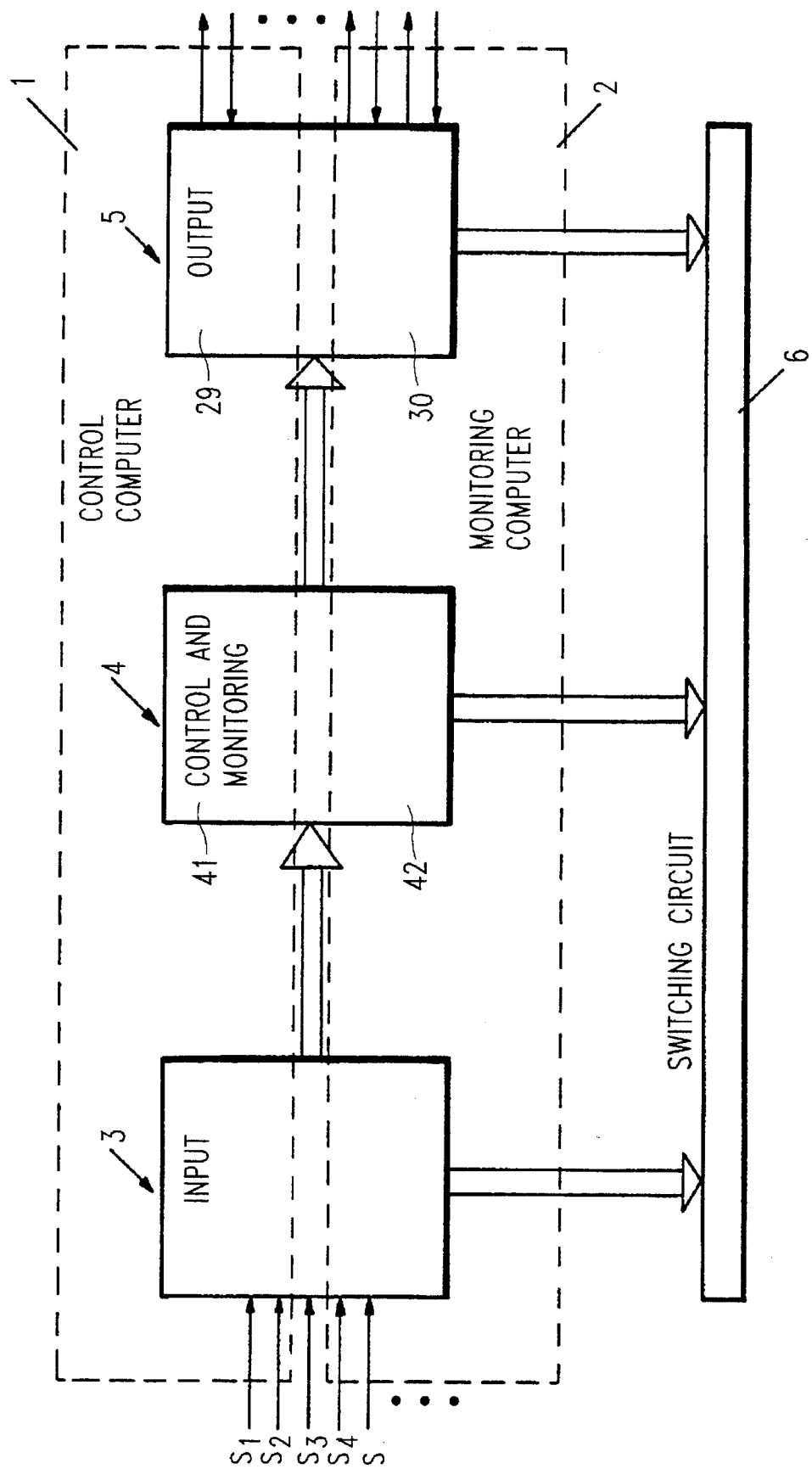
FIG. 1 shows in a schematic block circuit diagram the most important components of a circuit arrangement according to the invention.

As is clear from FIG. 1, a circuit arrangement for a brake system with anti-lock system and/or traction control comprises a control computer 1 and a monitoring computer 2 to which wheel sensor signals S1 to S4 and, if appropriate, further signals S can be fed on the input side and at whose output control signals for actuating the brake pressure control valves and further components as well as acknowledgement signals of these components are present. Here, it is to be expressly noted that the invention is not restricted to the use of computers but instead it is to be understood that the circuit arrangement can be constructed separately using analog, digital or hybrid technology.

The operation both of the control computer 1 and of the monitoring computer 2 can be divided schematically into three blocks, namely an input block 3, a monitoring and control block 4 and an output block 5, each of the three blocks being in each case both a component of the control computer 1 and a component of the monitoring computer 2. The input data are initially conditioned in the input block 3 and checked for faults, and the conditioned data are then processed in the control and monitoring block 4 in order to generate the control signals, on the one hand the control taking place in the control computer 1 being checked by the monitoring computer 2 and on the other hand the computer functions of the two computers 1, 2 being continuously tested. The data are then fed to the output block 5 in which the output signals are output and monitored.

As is further illustrated schematically in FIG. 1, the control of all three blocks 3, 4, 5 can be switched off by switching a circuit 6 for switching off the control system.

Figure 2:
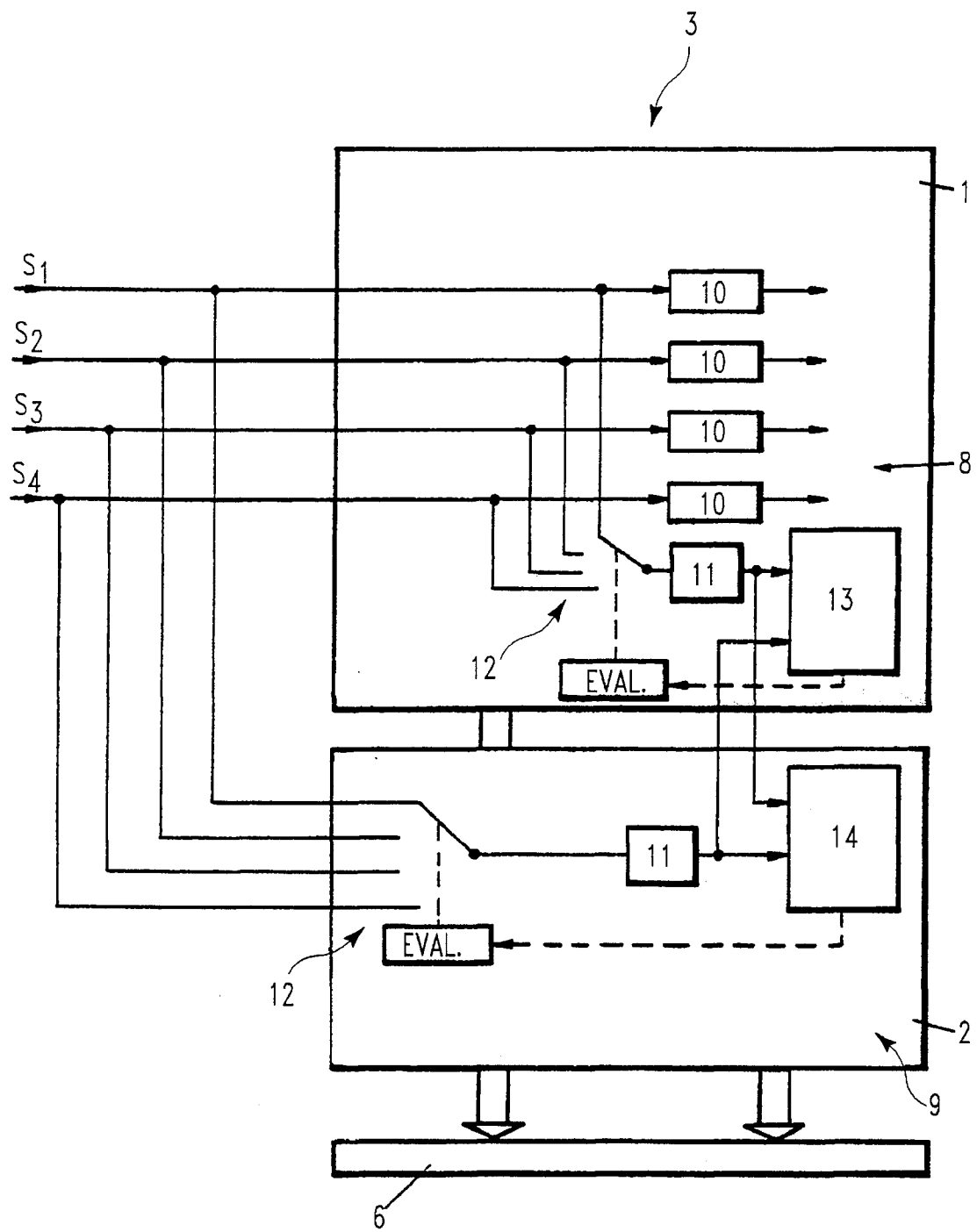
FIG. 2 shows in a schematic block circuit diagram the most important components of the input circuits.

As is clear from FIG. 1 and in particular from FIG. 2, the input block 3 is divided up into an input circuit 8 which is assigned to the control computer 1 and an input circuit 9 which is assigned to the monitoring computer 2. Both the input circuit 8 and the input circuit 9 comprise circuits, known per se, for calculating the speed of the vehicle wheels. Furthermore, both the input circuit 8 and the input circuit 9 each have multiplexer 12 which, in the time-division multiplexing method, each synchronously feed a single sensor signal of the input signals S1 to S4 initially in each case to a circuit 11 for calculating the rotational speed of the wheel which circuit 11 subsequently transmits the wheel speeds to a comparator circuit 13, 14. The comparison of the two wheel speeds respectively calculated in the input circuit 8 of the control computer 1 and in the input circuit 9 of the monitoring computer 2 is performed in the comparator circuits 13, 14 and in the case of non-correspondence the control is switched off by activating the circuits 6. By comparing in each case only one single input signal in the time-division multiplexing method using the comparators 13, 14 present in the two computers 1, 2, in particular the computational power of the monitoring computer 2 can be considerably reduced in comparison with known monitoring computers in which all four sensor signals have to be processed simultaneously. This permits the use of monitoring computers 2 with a substantially simplified structure. Moreover, deactivation of the entire control system can be achieved by the actual monitoring of the input signals S1 .

. . . S4 in the described way if for example the speeds of individual wheels differ considerably, which cannot be possible physically and must therefore be due to an operational fault of the system.

Figure 3:
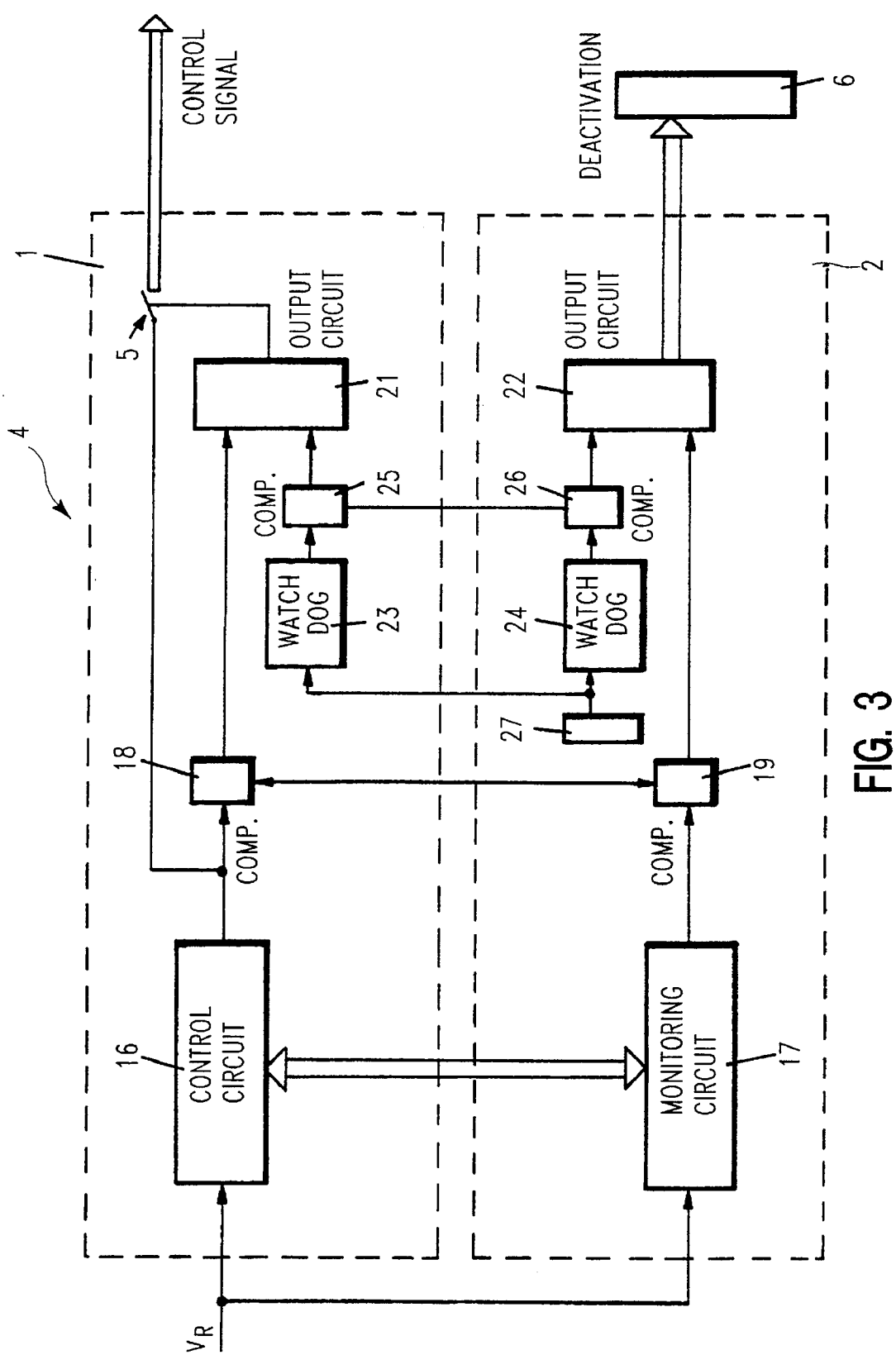
FIG. 3 shows in a schematic block circuit diagram the most important components of the controllers and monitoring circuits together with the watchdog circuits and FIG. 4 is a schematic view of the essential components of the output circuits.

As is clear from FIG. 1 and FIG. 3, the data conditioned and monitored in the input block 3 are fed to the control and monitoring block 4. The essential control, monitoring and watchdog algorithms are carried out in the control and monitoring block 4. The control and monitoring block 4 is in turn divided into a block 41 which is assigned to the control computer 1 and into a block 42 which is assigned to the monitoring computer 2. The conditioned data, i.e. the wheel speeds, are initially fed to a control circuit 16 and simultaneously to a monitoring circuit 17. Processing of a model algorithm which constitutes a simplified simulation of the control algorithm takes place in the monitoring circuit 17. Here, an exchange of data takes place between the control circuit 16 and the monitoring circuit 17, as is indicated schematically in FIG. 3 by a double arrow. The data generated by the control circuit 16 then pass on the one hand to a comparator circuit 18 and on the other hand to a switch 20, while the data generated by the monitoring circuit 17 as a result of the processing of the model algorithm pass to a comparator circuit 19. The comparison of the control signals generated by the control circuit 16, the actual ABS/TCS controller, with the signals generated by the monitoring circuit 17 by means of the model algorithm takes place in the comparator circuits 18, 19. If the two signals correspond within a prescribed tolerance range (tolerance window), in each case enabling signals are output by the comparator circuits 18, 19 to an output circuit 21 of the control computer 1 and to an output circuit 22 of the monitoring computer 2.

Furthermore, both the control computer 1 and the monitoring computer 2 have watchdog circuits 23, 24 as well as further comparator circuits 25, 26 which are connected downstream of the watchdog circuits 23, 24. The watchdog circuits 23, 24 serve to process a watchdog algorithm which tests the functioning of the control computer 1 and of the monitoring computer 2. Here, test data 27 which respectively permit the cyclical processing of the entire value range of the computers 1, 2 with statistically distributed data in the watchdog algorithms are fed to the watchdog circuits 23, 24 so that monitoring of all the essential computer functions of the two computers 1, 2 is ensured. A comparison of the results of the watchdog algorithms which are processed in the two watchdog circuits 23, 24 takes place in the two comparator circuits 25, 26. Here, an enabling signal is only passed on to the output circuits 21, 22 by the two comparator circuits 25, 26 if the results of the watchdog algorithms processed in the two computers correspond completely.

The control is accordingly only enabled if both the brake pressure control signals generated by the control circuit 16 completely correspond to the output signals of the monitoring circuit 17 within the tolerance range, and the results of the watchdog algorithms processed in the watchdog circuits 23, 24 in each case completely correspond. If for example the brake pressure control signals calculated in control circuit 16 and the output signals calculated in the monitoring circuits 17 by means of the model algorithms do correspond, while the results of the watchdog algorithms which have been processed in the watchdog circuits 23, 24 do not correspond, the switch 20 represented in the control computer 1 is opened so that no control signals are output and the control is to this extent switched off. Moreover, the entire control is also switched off by the circuit 22. In this case, a malfunction either of the control computer 1 or of the monitoring computer 2 has occurred. Advantageously, such a fault is detected for example even in the standby mode of the ABS/TCS system since the watchdog algorithms are continuously processed in both computers 1, 2. This is particularly advantageous because in this way a malfunction of the entire system can be detected even before the actual control occurs.

The comparator circuits 18, 19, 25, 26 and the output circuits 21, 22 are necessarily present in both computers 1, 2 because, in the event of a malfunction of a computer, under certain circumstances a satisfactory comparison of the signals is no longer possible and, as a consequence, this computer for example signals an enabling of the control although such enabling should not take place. Such a malfunction can only be detected by a second computer. As a result, an increase in the operational reliability is ensured since the probability of a simultaneous failure of both computers 1, 2 is substantially lower than that of the failure of a single computer.

Figure 4:
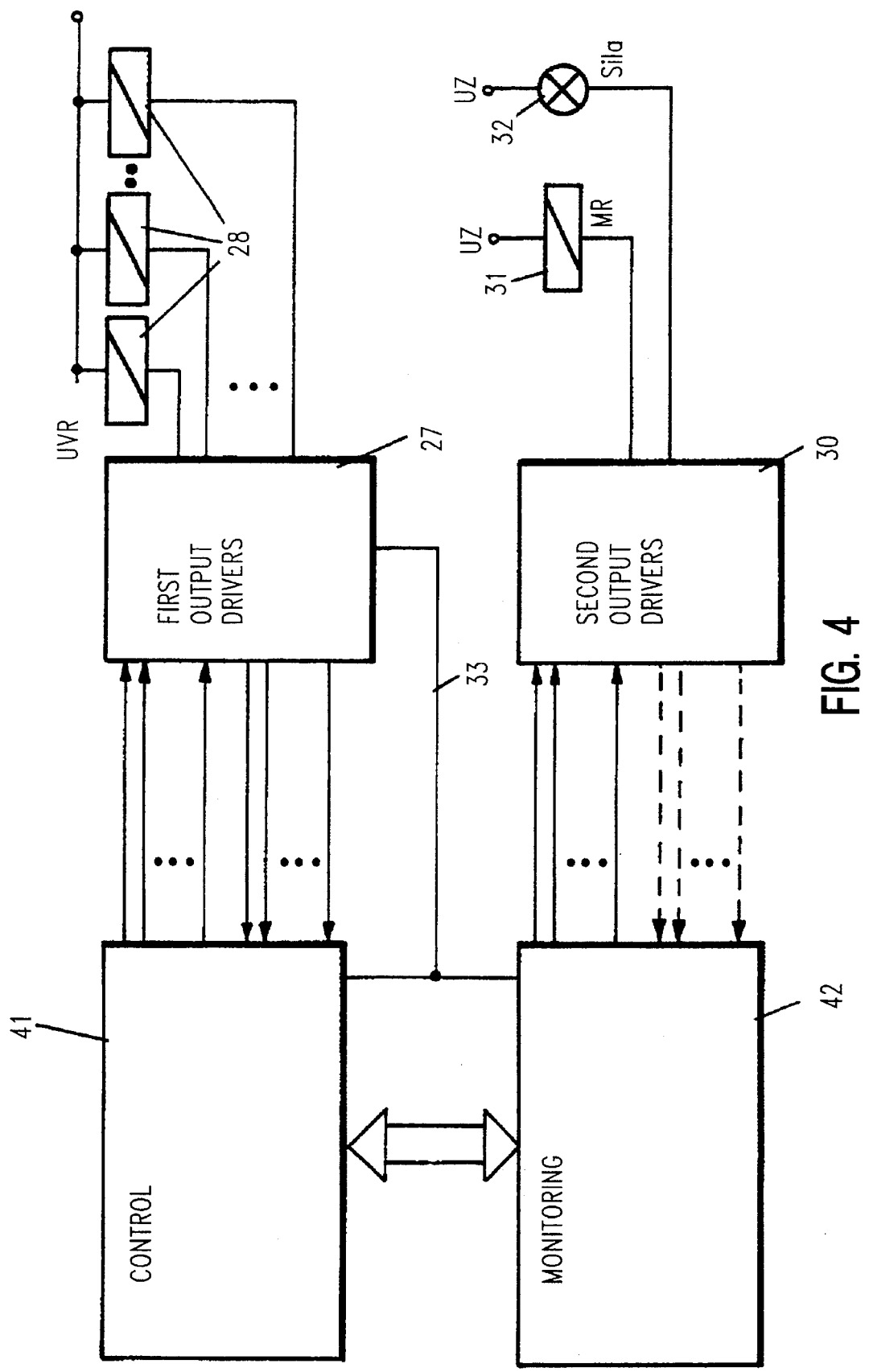

The output block 5 illustrated as a block-circuit diagram in FIG. 1 is illustrated in detailed form in FIG. 4. As is clear from FIG. 4, first output drivers 29 for actuating wheel solenoid valves 28 are connected downstream of the control block 41. In addition, the control block 41 receives from the first output drivers 29 feedback signals which signal for example the failure of one or more wheel solenoid valve signals, a line break and the like, and thus a case of a fault.

Connected downstream of the monitoring block 42 are second output drivers 30 which actuate further components, such as for example a motor relay 31 of the ABS pump or fault lights 32. In the case of the second output drivers 30 as well, functional failures of the actuated components, line breaks and quite generally faults in the peripherals are reported to the monitoring block 42 by means of feedback signals and, if appropriate, the control is switched off.

Furthermore, a signal line 33 serves to switch off the drivers 29 for actuating the wheel solenoid valves 28 if either the control block 41 or the monitoring block 42 detects a case of a fault. The signal line 33 can also be used as a test signal line in order to detect faults which can occur for example as a result of crosstalk of the signals present on the control signal lines to the acknowledgement line (so-called common-mode faults).

In summary, it is to be noted that the testing of the control system by comparing the control signals with the signals acquired in the model algorithms and by comparing the results of the watchdog algorithms processed in the watchdog circuits 23, 24 of the two computers 1, 2 complement one another.

By means of the watchdog computation it is in particular possible to detect computer faults which would have the effect on the system of degrading performance (for example lengthening the braking distance). Conversely, residual faults which are possibly not detected by the watchdog computation and have negative effects on the system behavior in a dangerous way can be detected and prevented by means of the simple physical model implemented in the monitoring computer 2.

Moreover, changes in the control algorithm in the control computer 1 are possible without effects on the simple physical model implemented in the monitoring computer 2, which in turn has the result that the control computer 1 can be modified independently of the monitoring computer 2 or that, conversely, the monitoring computer 2 can be used independently of the control computer 1. This permits the monitoring computer 2 to be used in very large numbers and thus permits very cost-effective application.

Finally, the testing of the control system by the combination of watchdog algorithm and model algorithm is also advantageous because only a simple physical system, which does not need to be adapted to vehicle-specific conditions, can be used as the model, and because the watchdog algorithm is, per se, independent of vehicle-specific data. This also increases the economic viability of control and monitoring computers 1, 2.

Finally, by dividing the actuation of the drivers 27, 30 between the control computer 1 and the monitoring computer 2, functions are distributed to a certain extent between the two computers 1, 2, and the monitoring computer 2 thus advantageously assumes port extension and actuation functions.

In conclusion, it is also to be noted that the circuit arrangement represented is not restricted to a brake system with anti-lock system and/or traction control but can also be used in a multiplicity of other applications, such as for example an active power steering system and the like.

I claim:

1. A circuit arrangement for a brake system with anti-lock system and/or traction control with input circuits for conditioning sensor signals, which represent rotational behavior of individual vehicle wheels, with output circuits for outputting control signals, with control circuits for processing the conditioned sensor signals and for generating control signals, with monitoring circuits to which the conditioned sensor signals can be fed, for processing a model algorithm which constitutes a simplified simulation of the control algorithm, with comparator circuits for comparing the signals of the control circuits with the corresponding signals of the monitoring circuits and with circuits for switching off the control in the event of a fault, wherein both the control circuits (16) and the monitoring circuits (17) comprise watchdog circuits (23, 24) for continuously processing a watchdog algorithm which tests the functioning of the control and monitoring circuits (16, 17) and comparator circuits (25, 26) for comparing the results of the processed watchdog algorithms, and wherein the output circuits (21, 22) only enable the control if both the control signals output by the control circuits (16) correspond to the corresponding signals of the monitoring circuits (17) and the results of the watchdog algorithms respectively processed in the watchdog circuits (23, 24) correspond.

2. The circuit arrangement as claimed in claim 1, wherein the comparison, performed in the comparator circuits (18, 19), of the brake pressure control signals, output by the control circuits (16), with the corresponding signals of the monitoring circuits (17) is restricted to compliance with prescribed tolerance ranges.

3. The circuit arrangement as claimed in claim 1, wherein the comparison performed in the comparator circuits (25, 26) requires the exact correspondence of the results of the watchdog algorithms processed in the watchdog circuits (23, 24).

4. The circuit arrangement as claimed in claim 1, wherein the control circuits (16), together with the associated input circuits (8), output circuits (21), watchdog circuits (23) and comparator circuits (13, 18, 25) are part of a control computer (1), and wherein the monitoring circuits (17), together with the associated input circuits (9), output circuits (22), watchdog circuits (24) and comparator circuits (14, 19, 26) are part of a monitoring computer (2).

5. The circuit arrangement as claimed in claim 4, wherein the monitoring computer (2) has a substantially simpler structure in comparison with the control computer (1).

6. The circuit arrangement as claimed in claim 5, wherein the entire value range of the computers (1, 2) is cyclically processed in the watchdog algorithms as test data (27) with statistical distribution.

7. The circuit arrangement as claimed in claim 4 wherein both the input circuits (8, 9) which are to be assigned to the control computer (1) and the ones which are to be assigned to the monitoring computer (2) have multiplexers (12) and comparator circuits (13, 14) which, in a time-division multiplexing method, compare individual conditioned sensor signals with one another and in the event of a fault switch off the control.

8. The circuit arrangement as claimed in claim 4, wherein the watchdog algorithms which are processed in the watchdog circuits (23, 24) are based on test data (27), as output data which permit all the essential computer functions both of the control computer (1) and of the monitoring computer (2) to be monitored.

9. The circuit arrangement as claimed in claims 4, wherein first output drivers (29) for actuating wheel solenoid valves (28) are connected downstream of the output circuits (21) of the control computer (1).

10. The circuit arrangement as claimed in claim 4, wherein second output drivers (30) for actuating further components (31, 32) are connected downstream of the output circuits (22) of the monitoring computer (2).

11. The circuit arrangement as claimed in claim 4, wherein feedback signals are transmitted from the first output drivers (29) to the control computer (1) and from the second output drivers (30) to the monitoring computer (2), which acknowledgement signals signal the fault of a peripheral component or a fault in the signal transmission to the component.

12. Apparatus for controlling a brake system comprising sensor means which provide sensor signals representing rotational behavior of vehicle wheels, input circuit means which process said sensor signals and produce wheel speed signals, control circuit means which process said wheel speed signals using a control algorithm to produce control signals, monitoring circuit means which process said wheel speed signals using a model algorithm, which constitutes a simplified simulation of the control algorithm, to produce monitoring signals, first comparator circuit means for comparing the control signals with the monitoring signals, control watchdog circuit means for continuously processing a control watchdog algorithm which tests the functioning of the control circuit means and produces control test results, monitoring watchdog circuit means for continuously processing a monitoring watchdog algorithm which tests the functioning of the monitoring circuit means and produces monitoring test results, second comparator circuit means for comparing the control test results with the monitoring test results, and output circuit means which transmit said control signals for controlling the brake system only when said control signals correspond to said monitoring signals and said control test results correspond to said monitoring circuit test results.

13. Method for controlling a brake system comprising providing sensor signals representing rotational behavior of the wheels, producing wheel speed signals by processing said sensor signals in an input circuit, producing control signals by means of a control circuit which processes said wheel speed signals using a control algorithm, producing monitoring signals by means of a monitoring circuit which processes said wheel speed signals using a model algorithm which constitutes a simplified simulation of the control algorithm, comparing said control signals with said monitoring signals, producing control test results by continuously processing a control watchdog algorithm which tests the functioning of the control circuit, producing monitoring test results by continuously processing a monitoring watchdog algorithm which tests the functioning of the monitoring circuit, comparing the control test results with the monitoring test results, and transmitting said control signals for controlling the brake system only when said control signals correspond to said monitoring signals and said control test results correspond to said monitoring test results.

14. Method as in claim 13 wherein said control signals correspond to said monitoring signals when said control signals and said monitoring signals are in a prescribed tolerance range.

15. Method as in claim 13 wherein said control test results correspond to said monitoring test results when control test results are the same as said monitoring test results.

* * * * *

UNITED STATES PATENT AND TRADEMARK OFFICE
CERTIFICATE OF CORRECTION

PATENT NO. : 5,588,720
DATED : December 31, 1996
INVENTOR(S) : Mattern, et. al.

It is certified that error appears in the above-identified patent and that said Letters Patent is hereby corrected as shown below:

In column 1, lines 15-18, delete "output circuits for outputting control signals for actuating solenoid valves which are exerted into the pressure medium paths of the brake,". (page 1, line 18)

In column 1, line 31, delete "processing". (page 1, lines 23-24)

In column 2, line 26, delete "characterizing features of". (page 2, line 1)

In column 2, lines 51-52, delete "Embodiments of the invention are described in the sub-claims. For example,". (page 2, line 2)

In column 3, line 8, delete "also by virtue of the fact". (page 2, line 6)

In column 3, line 10, delete "in". (page 2, line 7)

In column 3, line 62, after "these" insert -- computers --. (In the application, page 7, line 3)

In column 3, line 64, after "computer" delete -- , --. (page 2, line 20)

In column 4, line 39, before "circuit", delete "switching a" and insert therefor -- actuating a switching --. (page 3, lines 1-2)

In column 4, line 47, before "multiplexer" insert -- a --. (page 3, lines 4-5)

In column 4, line 51, before "which" insert -- , --. (page 3, lines 6-7)

In column 4, line 51, delete "subsequently" and insert therefor -- sequentially --. (page 3, lines 8-9)

UNITED STATES PATENT AND TRADEMARK OFFICE
CERTIFICATE OF CORRECTION

PATENT NO. : 5,588,720
DATED : December 31, 1996
INVENTOR(S) : Mattern, et. al.

It is certified that error appears in the above-identified patent and that said Letters Patent is hereby corrected as shown below:

In Claim 9, column 8, line 17, delete "claims" and insert therefor --claim--.

Signed and Sealed this

Twenty-fifth Day of July, 2000

Attest:

Attesting Officer

Q. TODD DICKINSON
Director of Patents and Trademarks